(12) United States Patent
Soergel

(10) Patent No.: US 11,301,649 B2
(45) Date of Patent: Apr. 12, 2022

(54) INTELLIGENT EMBLEMS AND BADGES

(71) Applicant: Richard C. Soergel, El Cajon, CA (US)

(72) Inventor: Richard C. Soergel, El Cajon, CA (US)

(*) Notice: Subject to any disclaimer, the term of this patent is extended or adjusted under 35 U.S.C. 154(b) by 0 days.

(21) Appl. No.: 16/445,977

(22) Filed: Jun. 19, 2019

(65) Prior Publication Data
US 2019/0384952 A1 Dec. 19, 2019

Related U.S. Application Data

(60) Provisional application No. 62/687,169, filed on Jun. 19, 2018.

(51) Int. Cl.
| | |
|---|---|
| *G06K 7/10* | (2006.01) |
| *H04B 5/00* | (2006.01) |
| *G09F 3/02* | (2006.01) |

(52) U.S. Cl.
CPC ........ G06K 7/10366 (2013.01); G09F 3/02 (2013.01); H04B 5/0056 (2013.01); *G09F 2003/0257* (2013.01); *G09F 2003/0282* (2013.01)

(58) Field of Classification Search
CPC ................................ G06K 7/10366
See application file for complete search history.

(56) References Cited

U.S. PATENT DOCUMENTS

| | | | | |
|---|---|---|---|---|
| 9,542,577 | B2* | 1/2017 | Butler | H04L 67/12 |
| 9,626,617 | B2* | 4/2017 | Martin | G06K 19/027 |
| 9,633,243 | B1* | 4/2017 | Geist | G06Q 20/3278 |
| 2014/0218173 | A1* | 8/2014 | Long | G06K 17/00 340/10.1 |
| 2017/0316234 | A1* | 11/2017 | Chang | G09F 3/02 |
| 2018/0083776 | A1* | 3/2018 | Helbert | G06F 3/067 |

* cited by examiner

*Primary Examiner* — Daniell L Negron
(74) *Attorney, Agent, or Firm* — Veros Legal Solutions, LLP

(57) ABSTRACT

A patch for displaying a visual representation is provided. The patch includes a first layer including the visual representation, a second layer coupled to the first layer such that a pocket is formed between the first and second layers, and a communication chip disposed within the pocket. The communication chip includes a memory having stored thereon first content associated with the visual representation, and a transceiver configured to transmit the first content to an electronic device based on the electronic device being physically disposed within a predetermined distance of the communication chip configured to trigger the transmission of the first content. Upon receipt by the electronic device, the first content is configured to cause the electronic device to display at least one of the first content and additional content associated with the first content on a display of the electronic device.

7 Claims, 3 Drawing Sheets

INTELLIGENT EMBLEMS AND BADGES

RELATED APPLICATIONS

This application claims priority to U.S. Provisional Application No. 62/687,169, filed on Jun. 19, 2018, the entire contents of which are hereby incorporated by reference.

BACKGROUND

The present disclosure relates to emblems and badges, such as those that may be applied to textiles such as clothing by various methods, such as sewing, heat application, or a hook and loop fastener such as Velcro for example.

Clothing, such as jackets, shirts, hats, and the like, are often adorned with separate emblems and badges made of cloth material, as well as other paper or laminate-based materials or rubber, PVC, plastic and woven materials. For brevity, such emblems and badges may be referred to herein as patches. These patches often show popular images, characters or slogans or can comprise logos for companies. While these patches are often used in conjunction with clothing, the patches themselves may also be sold as separate items for collectors and the like. Such emblems and badges may also be put on other items, such as promotional materials at trade shows or conferences. They can also be attached to consumer products. The patches may convey information via graphic images, phrases, logos and the like. For example, patches of popular sports team logos may include a logo that identifies the sports team.

It should be noted that this Background is not intended to be an aid in determining the scope of the claimed subject matter nor be viewed as limiting the claimed subject matter to implementations that solve any or all of the disadvantages or problems presented above. The discussion of any technology, documents, or references in this Background section should not be interpreted as an admission that the material described is prior art to any of the subject matter claimed herein.

SUMMARY

According to some embodiments, a patch for displaying a visual representation is provided. The patch includes a first layer including the visual representation, a second layer coupled to the first layer such that a pocket is formed between the first and second layers, and a communication chip disposed within the pocket. The communication chip includes a memory having stored thereon first content associated with the visual representation, and a transceiver configured to transmit the first content to an electronic device based on the electronic device being physically disposed within a predetermined distance of the communication chip configured to trigger the transmission of the first content. Upon receipt by the electronic device, the first content is configured to cause the electronic device to display at least one of the first content and additional content associated with the first content on a display of the electronic device.

In some embodiments, the first content comprises an identifier associated with at least one of the visual representation, the patch, and the communication chip. In some embodiments, upon receipt by the electronic device, the first content is configured to cause the electronic device to transmit an indication of at least a portion of the first content to a server, and receive the additional content from the server based on the indication. In some embodiments, the additional content is stored in the server and is configured to be modified such that transmission of the indication to the server at a first time before the additional content is modified results in receipt, by the electronic device, of the additional content comprising different content than if transmission of the indication to the server occurs at a second time after the additional content is modified. In some embodiments, the additional content comprises one or more of visual information, audio information, textual information, a uniform resource locator (URL) address and an advertisement regarding subject matter associated with the visual representation. In some embodiments, the communication chip comprises a near field communication chip.

According to some embodiments, a system for retrieving content associated with a visual representation disposed on a patch is provided. The system includes the patch. The patch includes a first layer comprising the visual representation, a second layer coupled to the first layer such that a pocket is formed between the first and second layers, and a communication chip disposed within the pocket. The communication chip includes a memory having stored thereon first content associated with the visual representation, and a first transceiver. The system includes an electronic device. The electronic device includes a reader configured to receive the first content from the first transceiver based on the electronic device being physically disposed within a predetermined distance of the communication chip configured to trigger communication of the first content, a display, and a processor configured to run an application configured to cause the display to present at least one of the first content and additional content associated with the first content based at least in part on receipt of the first content from the first transceiver.

In some embodiments, the first content comprises an identifier associated with at least one of the visual representation, the patch, and the communication chip. In some embodiments, the electronic device includes a transceiver and the application is further configured to cause the transceiver to transmit an indication of at least a portion of the first content to a server and receive the additional content from the server based on the indication. In some embodiments, the additional content is stored in the server and is modifiable such that transmission of the indication to the server at a first time before the additional content is modified results in receipt, by the transceiver, of the additional content comprising different content than if transmission of the indication to the server occurs at a second time after the additional content is modified. In some embodiments, the server further includes a user terminal configured to receive at least one indication of a modification of the additional content from a user and transmit the indication of the modification to the server, wherein the server is configured to apply the modification to the additional content. In some embodiments, the additional content comprises one or more of visual information, audio information, textual information, a uniform resource locator (URL) address and an advertisement regarding subject matter associated with the visual representation. In some embodiments, the electronic device includes at least one of a smartphone, a smartwatch, a personal computer, a laptop and a tablet. In some embodiments, the communication chip includes a near field communication chip.

According to some embodiments, a server for providing additional content associated with a visual representation disposed on a patch to a user is provided. The server is configured to receive an indication of first content associated with the visual representation from an electronic device, the first content received by the electronic device from a communication chip disposed within a pocket formed between a first layer of the patch and a second layer of the patch based on the electronic device being physically disposed within a predetermined distance of the communication chip. The server is configured to identify the additional content stored in the server that is associated with the first content. The server is configured to transmit the additional content to the electronic device, wherein the electronic device is configured to present at least one of the first content and the additional content on a display of the electronic device.

In some embodiments, the server is further configured to receive at least one indication of a modification of the additional content from a user terminal and apply the modification to the additional content. In some embodiments, the server is further configured to track one or more modifications to the additional content and cause automatic generation of at least one of a notification, a summary, and a bill associated with the one or more modifications. In some embodiments, the first content includes an identifier associated with at least one of the visual representation, the patch, and the communication chip disposed within the patch, and the additional content includes one or more of visual information, audio information, textual information, a uniform resource locator (URL) address and an advertisement regarding subject matter associated with the first content. In some embodiments, the electronic device includes at least one of a near-field communication equipped smartphone, smartwatch, personal computer, laptop and tablet. In some embodiments, the communication chip comprises a near field communication chip.

It is understood that various configurations of the subject technology will become apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

Various embodiments are discussed in detail in conjunction with the Figures described below, with an emphasis on highlighting the advantageous features. These embodiments are for illustrative purposes only and any scale that may be illustrated therein does not limit the scope of the technology disclosed. These drawings include the following figures, in which like numerals indicate like parts.

DETAILED DESCRIPTION

Figure 1:
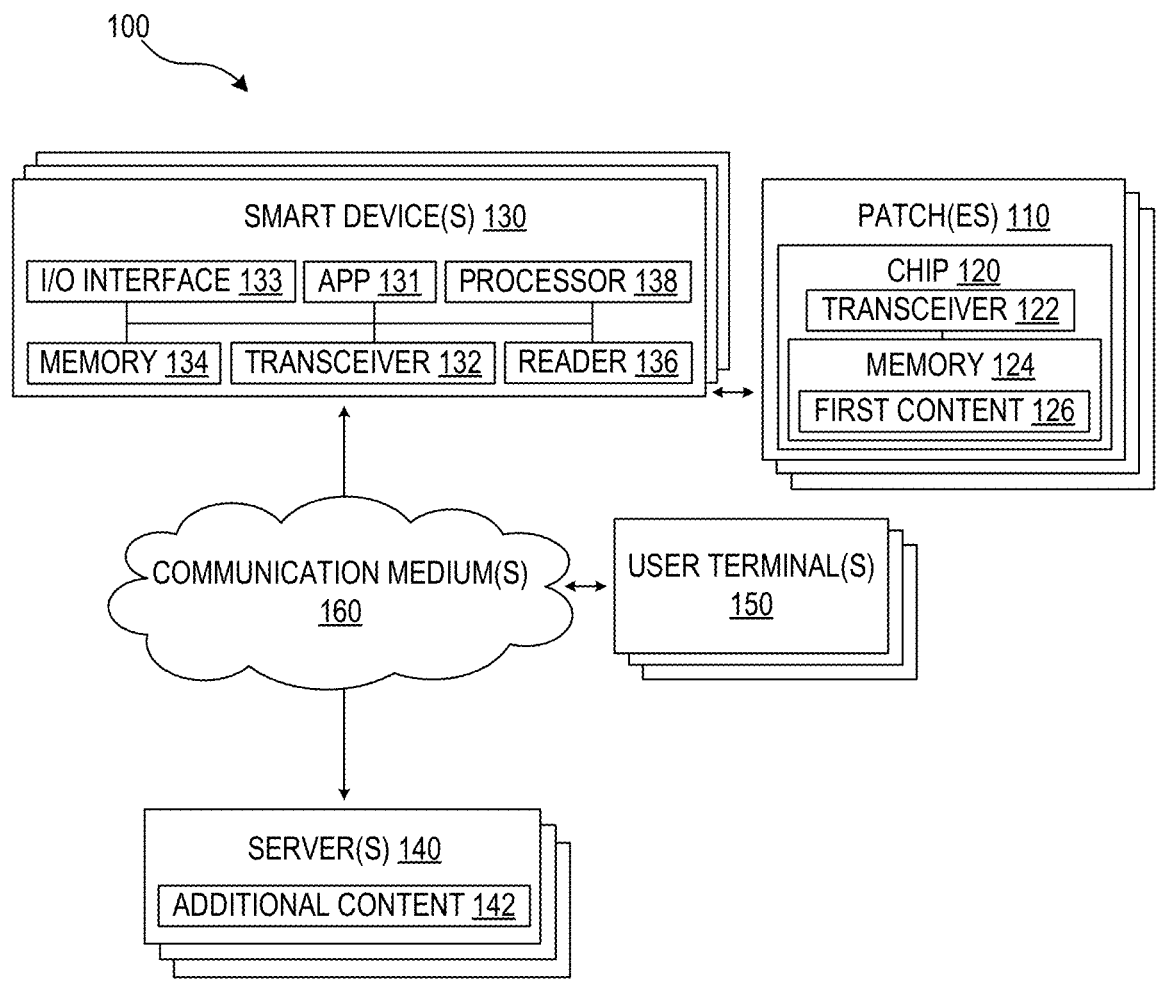
FIG. 1 is a block diagram of a system for utilizing content stored by a communication chip disposed within a patch to retrieve additional content on a smart device for display to a user, in accordance with some embodiments.
Figure 2:
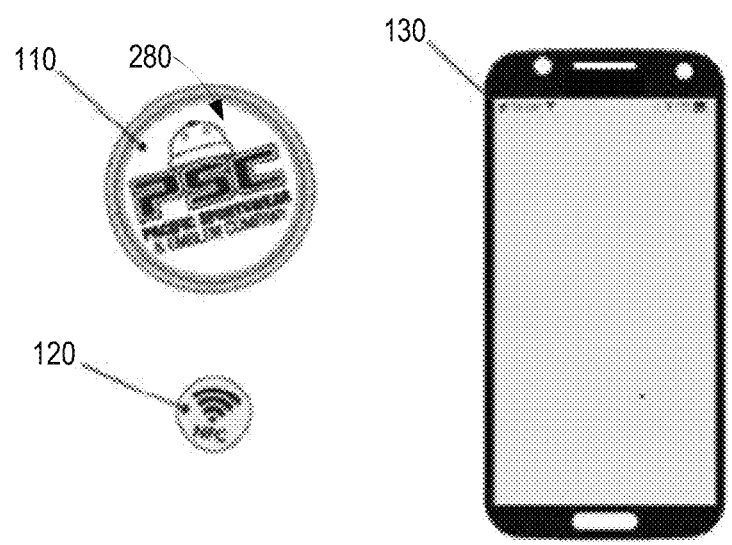
FIG. 2 is an exploded view of the patch comprising the communications chip readable by the smart device of FIG. 1, in accordance with some embodiments.

The following description and examples illustrate some exemplary implementations, embodiments, and arrangements of the disclosed invention in detail. Those of skill in the art will recognize that there are numerous variations and modifications of this invention that are encompassed by its scope. Accordingly, the description of a certain example embodiment should not be deemed to limit the scope of the present invention.

Implementations of the technology described herein are directed generally to intelligent emblems and badges, referred to herein as patches, for example, as applied to clothing or other items. In particular, this disclosure relates to patches comprising a communication chip that provides intelligent content to electronic devices configured to read information stored on the communication chip.

To facilitate an understanding of the various embodiments described herein, a number of terms are defined below.

DEFINITIONS

App: An app, which may be referred to as a mobile app, is a software program that is capable of executing on smartphone operating systems such as iOS and Android. Although an app is generally designed for operation on mobile devices, an app can be executed on non-mobile devices that are running an appropriate operating system.

Browser Engine and Web Page: A browser engine is a computer program that provides functionality to a computer for executing syntax contained in web pages. The computer may be connected to a computer network, and the network may be, and usually will be, the Internet. As used herein, browser engines and web pages together provide functionality to a computer connected to a network (e.g. the Internet) at least sufficient to request, retrieve, and display at least some network resources including web pages themselves, and to execute at least some links contained within or referred to in retrieved web pages to retrieve other web pages specified with the links. Web pages may include references such as uniform resource locators (URLs) and/or universal resource identifiers (URIs) to other network resources that contain images or other data that is retrieved by the browser engine from the network or from a cache memory when executing the web page, and may also include references to programs, libraries, style sheets, scripts, and the like which are called by the browser engine when executing the web page. Some of these items may require prior separate loading onto the computer (e.g. Flash and a Java Virtual Machine). Any of these items that are accessed, used, and/or retrieved during browser engine execution of web page syntax are considered to be included as a component of the "web page" as that term is used herein. Examples of browser engines include, but are not limited to, Internet Explorer and Edge distributed by Microsoft, and Chrome distributed by Google. Example web page syntax that can be executed by browser engines is the various versions of HyperText Markup Language (HTML) promulgated by the World Wide Web Consortium (W3C).

Server: Processing hardware coupled to a computer network having network resources stored thereon that is configured with software to respond to client access requests to use or retrieve the network resources stored on the server.

Internet: The globally interconnected system of computers and computer networks that evolved from ARPANET and NSFNET over the late 1980s and early 1990s that may utilize TCP/IP network communication protocols.

Network Resource Identifier: A definition of a network resource (e.g. by storage location and filename) that is used by client computers to specify a network resource in access requests issued to the network by the client computers. A network resource identifier may also be referred to as a location of a network resource such as an image or a web page. Currently, when the network is the Internet, Network resource identifiers are known as URLs that are formatted in accordance with RFC 3986 of the Internet Engineering Task Force (IETF). For the purposes of this disclosure, any format for specifying a network resource in client access requests issued to a network is within the definition of the term Network Resource Identifier. A network resource identifier, including URLs as currently defined on the Internet, may further include data in addition to data identifying the network resource that a server hosting the network resource associated with the network resource identifier may use for other purposes beyond identifying the requested network resource.

Web Site: A collection of network resources including at least some web pages that share a common network resource identifier portion, such as a set of web pages with URLs sharing a common domain name but different pathnames.

Web Server: A server that includes functionality for responding to requests issued by browsers to a network, including, for example, requests to receive network resources such as web pages. Currently, browsers and web servers format their requests and responses thereto in accordance with the HyperText Transfer Protocol (HTTP) promulgated by the IETF and W3C. In some embodiments, a web server may also be a content server.

World Wide Web: The collection of web pages stored by and accessible to computers running browsers connected to the Internet that include references to each other with links.

Link: Syntax that instructs a browser executing the syntax to access a network resource defined directly or indirectly by the syntax. The link syntax and/or internal browser engine functionality may also define conditions under which the access request is made by the browser engine, for example through cursor position and/or other interaction with an I/O device such as a keyboard or mouse. Some link syntax may cause the browser engine to access the specified network resource automatically while processing the syntax without user prompt or interaction. Links include HTML hyperlinks. A link may be directly coded with, for example, HTML tags and an explicit URL, or may be in the form of a script or other called function defined in a browser, in a browser extension, and/or in a webpage.

Network Resource: A web page, file, document, program, service, or other form of data or instructions which is stored on a network node and which is accessible for retrieval and/or other use by other network nodes.

Navigate: Controlling a browser engine and/or a browser extension to use a series of links to access a series of network resources As indicated above, the word patch as used herein refers to emblems, badges and the like that accessorize various items, traditionally clothing items. They may have a decorative purpose, and often include graphics and/or textual information related to some product, organization or achievement that has meaning to the person displaying the patch. They may also be used to demonstrate having loyalty or affection to a product, brand, state, flag, school, etc. They may be attached to the items in a permanent or temporary manner in a variety of ways, including sewing, heat, adhesive, hook and loop fasteners. They are traditionally and very often made from fabric textiles, embroidery, and the like, although other materials may also be used. Traditionally, the only function such patches could perform was as a form of decorative display of something significant to one displaying it and/or to one working to get people to display it for marketing purposes.

While patches are good at conveying information in a brief visual sense, it is desirable to be able to deliver greater content to a viewer of the patch. To this end, there is a need for a patch that can convey information directly to a viewer's smart device, such as a smart phone, tablet and the like, that may be configured to automatically direct the user to either content stored locally in the patch or content that is stored online that can be accessed by the viewer's smart device.

FIG. 1 is a block diagram of a system 100 for utilizing content stored by a communication chip 120 disposed within a patch 110 to retrieve additional content 142 on an electronic device 130 for display to a user, in accordance with some embodiments. Description of one or more features of system 100 will be described below, and in some cases, with reference to one or more of FIGS. 2-5.

Figure 3:
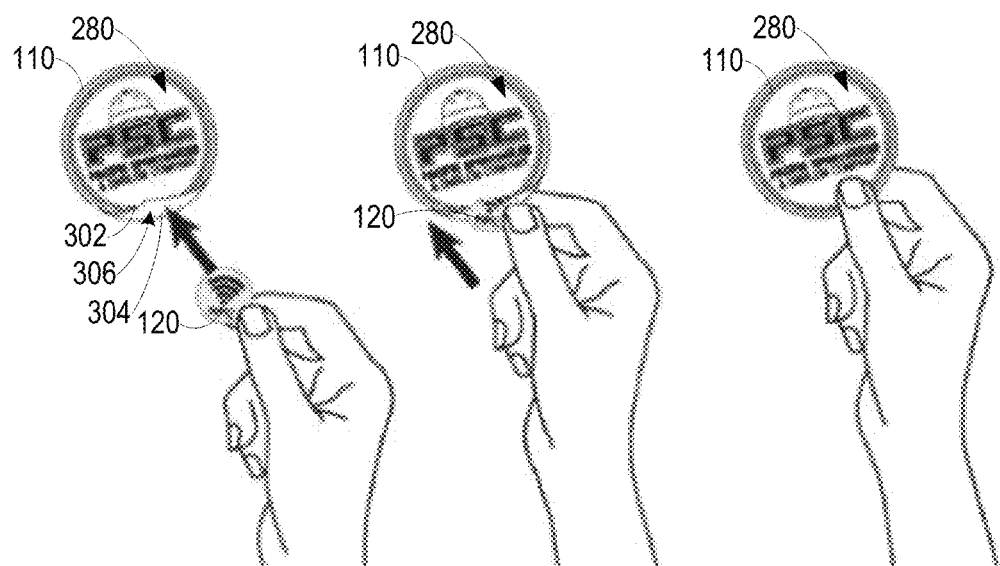
FIG. 3 illustrates installation of the communications chip into the patch, in accordance with some embodiments.

FIG. 1 illustrates one or more patches 110. Patch 110 can be a cloth patch, a plastic patch, or a patch comprising any suitable material. As illustrated in FIG. 3, patch 110 can comprise at least a first layer 302 and a second layer 304 bonded, sewn, adhered, fitted and/or coupled to first layer 302 utilizing any suitable method. In some embodiments, first layer 302 can have imprinted, sewn or otherwise embedded thereon a visual representation 280 of a character in a movie, a sports team, a celebrity, a logo or any other suitable visual representation of desired subject matter (see also, FIG. 2). First layer 302 and second layer 304 can be coupled to one another such that a pocket 306 is formed between at least a portion of first layer 302 and at least a portion of second layer 304. A communication chip 120 can be disposed within pocket 306 and pocket 306 can then be sealed, sewn up, or otherwise closed such that communication chip 120 is secured therein (see, e.g., FIG. 3).

In some embodiments, communication chip 120 comprises a near-field communication (NFC) or radio-frequency ID (RFID) chip. However, the present disclosure is not so limited and communication chip 120 can comprise any type of chip configured to communicate with another suitably configured device disposed within a suitable or predetermined distance from communication chip 120 (e.g., 0-10 cm). Communication chip 120 comprises a transceiver 122 and a memory 122. Transceiver 122 can comprise any antenna suitable for any wireless communication as described herein, for example, communication in low frequency (e.g., 30 kHz-300 kHz), high frequency (e.g., 3-30 MHz) or ultra-high frequency (e.g., 300 MHz-3 GHz) ranges.

Memory 122 is configured to store first content 126. In some embodiments, first content 126 can comprise additional visual, audio and/or textual information about the subject matter of visual representation 280 on patch 110, e.g., a video, a video game, an advertisement, a link to a website, a URL, a bit URL, stories of fantasy worlds, characters, sports teams or players, trading cards, promotional materials, coupons for free merchandise, contact information and/or any other desired content in addition to that which visual representation 280 displays on patch 110 itself.

However, the present disclosure is not so limited and first content 126 can also or alternatively comprise an identification number or other identifier uniquely associated with the specific patch 110, uniquely associated with the specific communication chip 120, or uniquely associated with the specific visual representation 280 disposed on patch 110. Additional content 142 associated with such an identifier may be stored, customized, adjusted, updated or otherwise provided at and/or from a physically separate location (e.g., server 140 of FIG. 1) as will be describe in more detail below.

First content 126 can be coded to communication chip 120 before, during or after communication chip 120 is disposed within patch 110, for example at a factory and/or during a factory fabrication process for one or both of patch 110 and chip 120. Transceiver 122 is configured to receive first content 126 and memory 124 is configured to store first content 126. Transceiver 122 is further configured to transmit first content 126 to an electronic device 130 based at least in part upon electronic device 130 being disposed within sufficient proximity of patch 110, as will be described in more detail below.

System 100 can further include electronic device 130, which in some embodiments can be a smartphone, a smartwatch, a personal computer, a laptop, a tablet, or any other electronic device suitably configured to wirelessly communicate with communication chip 120 of patch 110.

Figure 4:
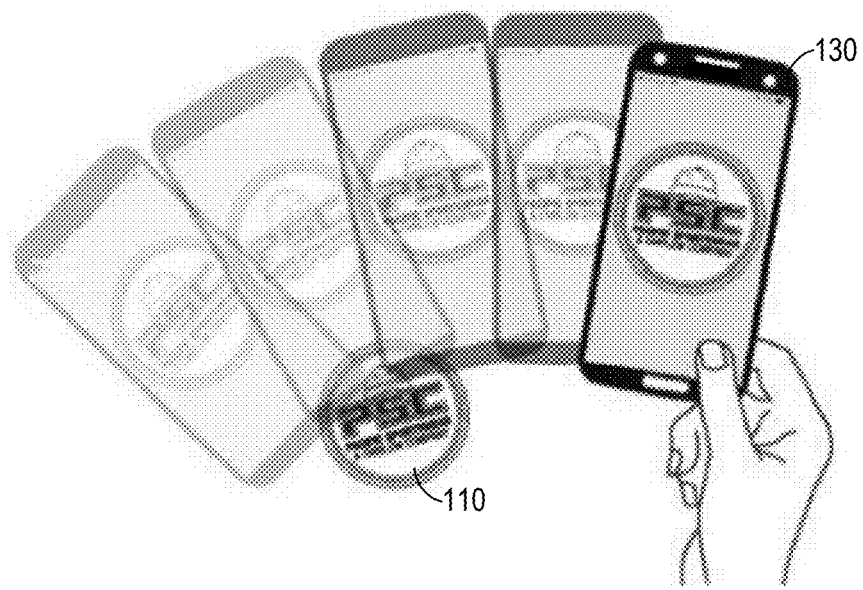
FIG. 4 illustrates how the smart device can read the content of the communications chip by scanning the patch, in accordance with some embodiments.

Electronic device 130 comprises a reader 136 configured to communicate with communication chip 120 and retrieve first content 126 therefrom. For example, where communication chip 120 of patch 110 comprises an NFC or other RFID chip, reader 136 can comprise an NFC or other RFID reader. Generic readers with the ability to extract information from such chips are available for download to devices such as smartphones. However, as described below, in some embodiments an app that is specially designed to work with the patches (as opposed to any communication chip provided with other products such as credit cards, store inventory, and the like) is made part of the system to better control the user experience. In many cases, these readers recognize a stored website URL and will navigate a browser in the smartphone to the site stored in the chip. Accordingly, in some such embodiments, reader 136 can be configured to wirelessly transmit sufficient power to communication chip 120 such that transceiver 122 is sufficiently powered to transmit first content 126 to reader 136 when electronic device 130 is brought sufficiently close to patch 110 (e.g., within several centimeters). For example, FIG. 4 illustrates electronic device 130 being moved or waved over and sufficiently close to patch 110 such that communication chip 120 (not visible in FIG. 4) within patch 110 transmits first content 126 to electronic device 130, in some embodiments, for display to a user (see, e.g., FIG. 5).

As illustrated in FIG. 1, electronic device 130 further includes a processor 138, memory 134, an application (app) 131 comprising non-transitory computer-readable code, instructions and/or other programming that can be stored within memory 134 and run on processor 138 and/or memory 134, an input/output interface 133 configured to at least display content to a user (see, e.g., FIG. 5), and a transceiver 132 configured to transmit and receive data and/or otherwise communicate with one or more additional devices (e.g., server 140 and/or user terminal 150) via communication medium 160), as will be described in more detail below.

In some embodiments, app 131 can be downloaded from an app store such as the Apple App Store or Google Play or may be otherwise installed on electronic device 130 according to any suitable method. App 131 can comprise code, instructions and/or other programming configured to provide functionality to a user of electronic device 130 with respect to at least first content 126 stored within memory 124 of communication chip 120 of patch 110. For example, based on receipt of first content 126 from chip 120 of patch 110 as described above, app 131 can be configured to display first content 126 to a user of electronic device 130 on I/O interface 133 (see, e.g., FIG. 5).

Figure 5:
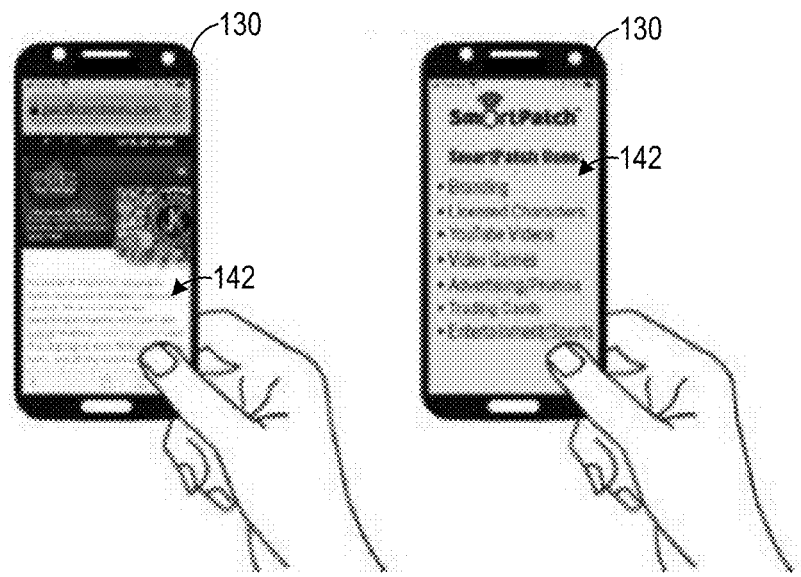
FIG. 5 illustrates how reading the content on the communications chip can cause the smart device to display the additional content to the user, in accordance with some embodiments.

For example, where first content 126 itself comprises additional visual, audio and/or textual information about the subject matter of visual representation 280 on patch 110 (e.g., a video, a video game, an advertisement, a link to a website, a URL, a bit URL, stories of fantasy worlds, characters, sports teams or players, trading cards, promotional materials, coupons for free merchandise, contact information and/or any other desired content), app 131 can be configured to directly display such content to the user on I/O interface 133 of electronic device 130 (see, e.g., FIG. 5). In some embodiments, first content 126 can be encrypted and app 131 can be configured to decrypt first content 126 so that it can be displayed to a user of electronic device 130 in understandable form and/or so that it can be forwarded or otherwise provided to another device (e.g., server 140) for ultimate retrieval of additional content as will be described in more detail below. Encrypting at least a portion of first content 126 and providing decrypting capability within app 131 can allow tighter control over the user experience. Since such specific decrypting or other functional capabilities can be provided by app 131 and can be required to properly display or otherwise utilize first content 126, third party readers and/or applications that might otherwise be able to read first content 126 from communication chip 120 within patch 110, but not display first content 126 or other additional content 142 in a desired fashion, can be rendered incompatible with system 100.

In some embodiments, in addition or alternative to first content 126 itself comprising the additional visual, audio and/or textual information about the subject matter of visual representation 280, first content 126 can comprise an identifier uniquely associated with the specific patch 110, uniquely associated with the specific communication chip 120, or uniquely associated with the specific visual representation 280 on patch 110. In such embodiments, app 131 can be configured to receive the identifier within first content 126 from communication chip 120 via reader 136. App 131 can be configured to transmit, forward and/or otherwise provide an indication of the identifier to server 140, via transceiver 132 and communication medium 160, which can comprise any suitable radio-frequency, cellular, wireless or wired communication medium, typically including the Internet.

Server 140 can be configured to receive the identifier from electronic device 130. Server 140 can store a lookup table or any other suitable database or data structure that correlates, links or otherwise associates the identifier with additional content 142. In such embodiments, additional content 142 can comprise additional visual, audio and/or textual information about the subject matter of visual representation 280 on patch 110 (e.g., a video, a video game, an advertisement, a link to a website, a URL, a bit URL, stories of fantasy worlds, characters, sports teams or players, trading cards, promotional materials, coupons for free merchandise, contact information and/or any other desired content). Server 140 can be configured to identify additional content 142 corresponding, linked or otherwise associated with the identifier. Server 142 can be configured to transmit additional content 142 to electronic device 130 via communication medium 160, which may be the same or a different communication medium from that utilized to communicate the identifier to server 140. Upon receipt, app 131 can be configured to display additional content 142 to the user on I/O interface 133 of electronic device 130 (see, e.g., FIG. 5).

In some embodiments, because additional content 142 is stored in server 140, rather than directly within memory 124 of communication chip 120 within patch 110, additional content 142 can be added, removed, changed, updated, adjusted or otherwise modified at any time before, during or after the fabrication of patch 110. Accordingly, a user experience associated with the specific patch 110, communication chip 120, and/or visual representation 280 on patch 110 can be customized, adapted or changed at any time just by changing the information associated with the identifier in the server look-up table, even after patch 110 has been purchased by or otherwise provided to an end user.

For example, in some embodiments, a user can utilize one or more user terminal(s) 150 to track, view, customize, adapt or change additional content 142, stored in server 140, that is associated with the particular identifier(s) stored in memory 124 within patch 110. In some embodiments, user terminal 150 can comprise a smartphone, a smartwatch, a personal computer, a laptop, a tablet, or any other electronic device suitably configured to wirelessly communicate with at least server 140. Often, such a user of user terminal 150 (e.g., a retailer, person or company associated with the visual representation 280 on patch 110) can be different from an end user (e.g., a customer) of electronic device 130 and/or patch 110, although the present disclosure is not so limited. For example, the user can log into a user account via user terminal 150, which may allow the user to upload, download, view, track, modify or otherwise interact with additional content 142 stored on server 140. In some embodiments, server 140 and/or another server (not shown) can be configured to support, log and/or otherwise track different user accounts and any activity (e.g., uploads, downloads, views, modifications, etc.) associated with additional content 142, first content 126, communication chip 120, patch(es) 110, electronic device(s) 130 and/or user terminal(s) 150. Accordingly, in some embodiments, server 140 and/or another server can be configured to automatically, or manually in response to user input, provide a summary, a bill, or any other notification associated with such activity to the appropriate user, whether an end user of patch 110, of electronic device 130 and/or of user terminal 150. Such functionality not only provides for additional customization of the user experience, but also provides for automating tasks associated with tracking and/or managing such customization.

In some embodiments, fabrication of communication chip 120 and patch 110 can include any one or more of: preparing communication chip 120 and the antenna ultimately disposed within transceiver 122 for bonding, bonding communication chip 120 and such an antenna, preparing a surface material of chip 120 for blank white and/or external printing, bonding such a surface material to chip 120, die cutting of chip 120 and/or the surface material to a desired shape and size, e.g., individually or in a roll, testing operation of chip 120, encoding first content 126 and/or other data into memory 126, external printing of one or more IDs corresponding to chip 120 on chip 120, final testing of the operation of chip 120 and packaging for shipping.

The systems and methods described above may be operational with numerous general-purpose or special-purpose computing system environments, configurations, processors and/or microprocessors. Examples of well-known computing systems, environments, and/or configurations that may be suitable for use with the technology disclosed herein include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

A microprocessor may be any conventional general-purpose single- or multi-chip microprocessor such as but not limited to a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system described above may comprises various modules and/or components. Since functionality of one module may be performed along with or by one or more other modules, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

Instructions or code utilized by or for the system may be written in any programming language such as but not limited to C, C++, BASIC, Pascal, or Java.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers.

Combinations of the above should also be included within the scope of computer-readable media.

Further, it should be appreciated that modules and/or other appropriate means for performing the methods and techniques described herein can be downloaded and/or otherwise obtained by a user device/terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

General Interpretive Principles for the Present Disclosure

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the disclosure. For example, a system or an apparatus may be implemented, or a method may be practiced using any one or more of the aspects set forth herein. In addition, the scope of the disclosure is intended to cover such a system, apparatus or method which is practiced using other structure, functionality, or structure and functionality in addition to or other than the various aspects of the disclosure set forth herein. It should be understood that any aspect disclosed herein may be set forth in one or more elements of a claim. Although some benefits and advantages of the preferred aspects are mentioned, the scope of the disclosure is not intended to be limited to particular benefits, uses, or objectives. The detailed description and drawings are merely illustrative of the disclosure rather than limiting, the scope of the disclosure being defined by the appended claims and equivalents thereof.

With respect to the use of plural vs. singular terms herein, those having skill in the art can translate from the plural to the singular and/or from the singular to the plural as is appropriate to the context and/or application. The various singular/plural permutations may be expressly set forth herein for sake of clarity.

When describing an absolute value of a characteristic or property of a thing or act described herein, the terms "substantial," "substantially," "essentially," "approximately," and/or other terms or phrases of degree may be used without the specific recitation of a numerical range. When applied to a characteristic or property of a thing or act described herein, these terms refer to a range of the characteristic or property that is consistent with providing a desired function associated with that characteristic or property.

In those cases where a single numerical value is given for a characteristic or property, it is intended to be interpreted as at least covering deviations of that value within one significant digit of the numerical value given.

If a numerical value or range of numerical values is provided to define a characteristic or property of a thing or act described herein, whether or not the value or range is qualified with a term of degree, a specific method of measuring the characteristic or property may be defined herein as well. In the event no specific method of measuring the characteristic or property is defined herein, and there are different generally accepted methods of measurement for the characteristic or property, then the measurement method should be interpreted as the method of measurement that would most likely be adopted by one of ordinary skill in the art given the description and context of the characteristic or property. In the further event there is more than one method of measurement that is equally likely to be adopted by one of ordinary skill in the art to measure the characteristic or property, the value or range of values should be interpreted as being met regardless of which method of measurement is chosen.

It will be understood by those within the art that terms used herein, and especially in the appended claims (e.g., bodies of the appended claims) are intended as "open" terms unless specifically indicated otherwise (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

In those instances where a convention analogous to "at least one of A, B, and C" is used, such a construction would include systems that have A alone, B alone, C alone, A and B together without C, A and C together without B, B and C together without A, as well as A, B, and C together. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include A without B, B without A, as well as A and B together."

Various modifications to the implementations described in this disclosure can be readily apparent to those skilled in the art, and generic principles defined herein can be applied to other implementations without departing from the spirit or scope of this disclosure. Thus, the disclosure is not intended to be limited to the implementations shown herein but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A system for providing additional content associated with a patch to a user, the system comprising:
    application software configured for execution on a handheld electronic device, wherein the application software is configured to wirelessly obtain information identifying the patch and/or a visual representation provided with the patch from a communication chip provided with the patch;
    a server configured to:
        communicate with the application software;
        receive the obtained information identifying the patch and/or the visual representation provided on the patch from the application software;
        maintain a data structure that correlates, links, or otherwise associates information identifying patches and/or the visual representation thereof with content;
        using the received identifying information, access the data structure;
        select content linked to the patch and/or the visual representation provided on the patch with the identifying information by the data structure;
        transmit the selected content to the application software; and
        host user accounts configured to allow users to interact with the data structure and manage customization of user experiences with patches associated with the identifying information.

2. The system of claim 1, wherein the server is further configured to:
    receive at least one indication of a modification of the data structure from a user terminal; and
    apply the modification to the data structure.

3. The system of claim 1, wherein the server is further configured to:
    track one or more modifications to the data structure; and
    cause automatic generation of at least one of a notification, a summary, and a bill associated with the one or more modifications.

4. The system of claim 1, wherein:
    the additional content comprises one or more of visual information, audio information, textual information, a uniform resource locator (URL) address and an advertisement regarding subject matter associated with the visual representation.

5. The system of claim 1, wherein the electronic device comprises at least one of a near-field communication equipped smartphone, smartwatch, personal computer, laptop and tablet.

6. The system of claim 1, wherein the communication chip comprises a near field communication chip.

7. The system of claim 1, wherein the data structure comprises a look-up table.

* * * * *